(12) United States Patent
Albinsson et al.

(10) Patent No.: US 8,037,948 B2
(45) Date of Patent: Oct. 18, 2011

(54) DRILLING MACHINE

(75) Inventors: Mari Albinsson, Göteborg (SE); Klas Nordgren, Göteborg (SE); Ulf Petersson, Tollered (SE)

(73) Assignee: Husqvarna Aktiebolag, Huskvarna (SE)

( * ) Notice: Subject to any disclaimer, the term of this patent is extended or adjusted under 35 U.S.C. 154(b) by 204 days.

(21) Appl. No.: 12/439,285

(22) PCT Filed: Aug. 31, 2007

(86) PCT No.: PCT/SE2007/000763
§ 371 (c)(1),
(2), (4) Date: Apr. 24, 2009

(87) PCT Pub. No.: WO2008/026987
PCT Pub. Date: Mar. 6, 2008

(65) Prior Publication Data
US 2010/0014932 A1    Jan. 21, 2010

(30) Foreign Application Priority Data

Sep. 1, 2006   (SE) ...................................... 0601791

(51) Int. Cl.
*E21B 3/00*        (2006.01)
*B25B 27/10*       (2006.01)
(52) U.S. Cl. ........... 173/216; 173/199; 173/218; 408/56
(58) Field of Classification Search ................. 173/213, 173/216, 197, 199, 59, 61, 63, 64, 78, 79, 173/80, 73; 408/56, 57
See application file for complete search history.

(56) References Cited

U.S. PATENT DOCUMENTS

| | | | | |
|---|---|---|---|---|
| 1,069,288 A * | 8/1913 | Prellwitz | ......................... | 285/96 |
| 2,081,919 A * | 6/1937 | Gartin | ............................. | 173/78 |
| 2,115,911 A * | 5/1938 | Gartin | ............................. | 173/97 |
| 2,434,120 A * | 1/1948 | Paget | .................................. | 173/5 |
| 3,421,392 A * | 1/1969 | Bangerter et al. | .............. | 408/57 |
| 5,327,979 A * | 7/1994 | Du et al. | .......................... | 173/74 |
| 6,575,254 B2 * | 6/2003 | Bongers-Ambrosius et al. | ............................. | 173/201 |
| 2004/0163832 A1 * | 8/2004 | Riedl | ............................ | 173/217 |

* cited by examiner

*Primary Examiner* — Paul Durand
(74) *Attorney, Agent, or Firm* — Novak Druce + Quigg LLP

(57) ABSTRACT

A drilling machine includes a motor housing, a gear box housing, a shaft driven by the motor and extending into the gear box housing, a drilling shaft extending through the gear box housing and having an outgoing channel arranged in the drilling shaft for supply/removal of a drill flow medium to/from a tool part that is connectable to the drilling shaft, a drill flow medium room, between the motor housing and gear box housing, that can be supplied with drill flow medium when the drilling machine is in operation, and an incoming drill flow medium conduit for the supply/removal of the drill flow medium to/from the drill flow medium room. The motor housing includes a detachable end cover which forms the rear unit of the drilling machine. The gear box housing includes a detachable end cover that forms the front unit of the drilling machine.

20 Claims, 11 Drawing Sheets

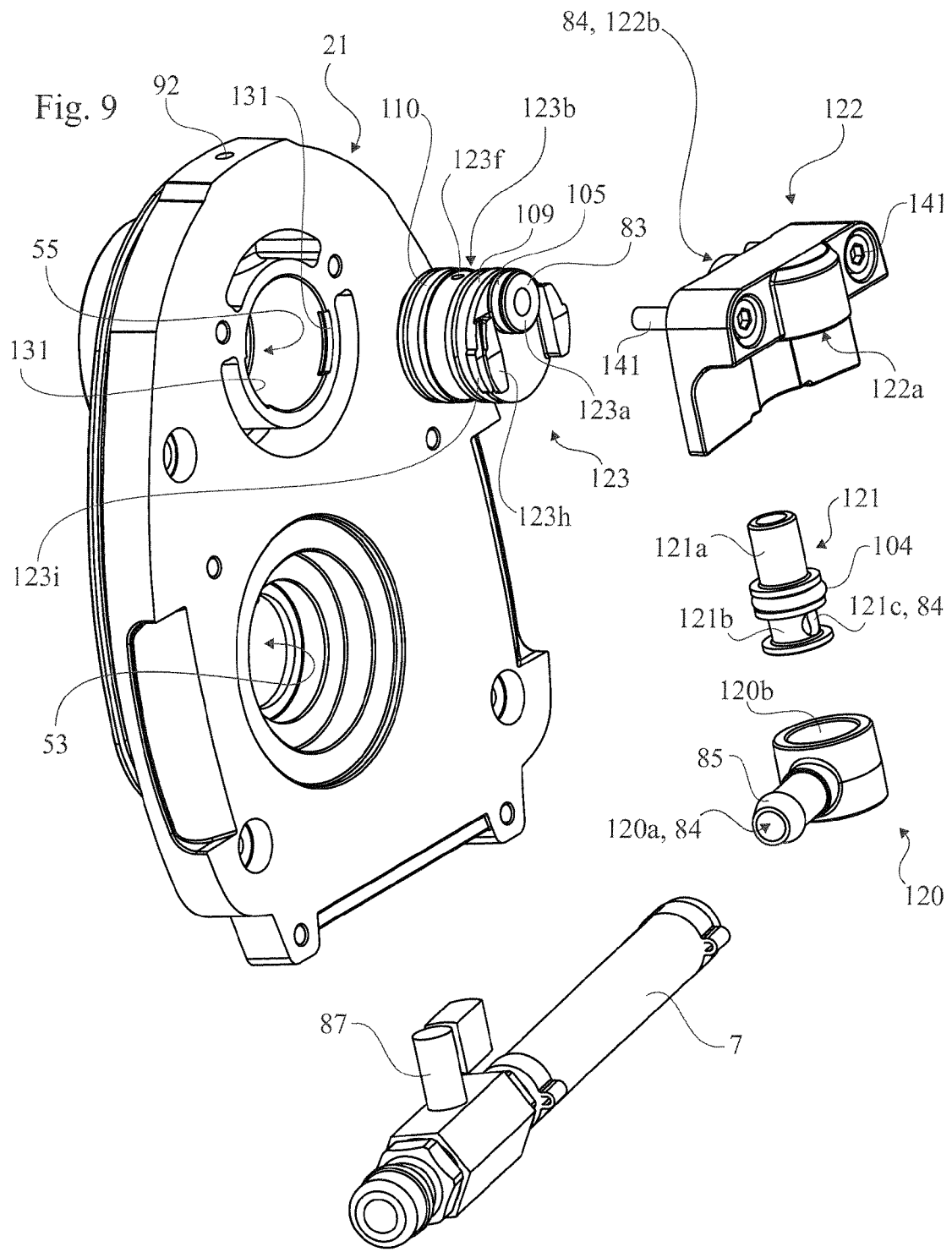

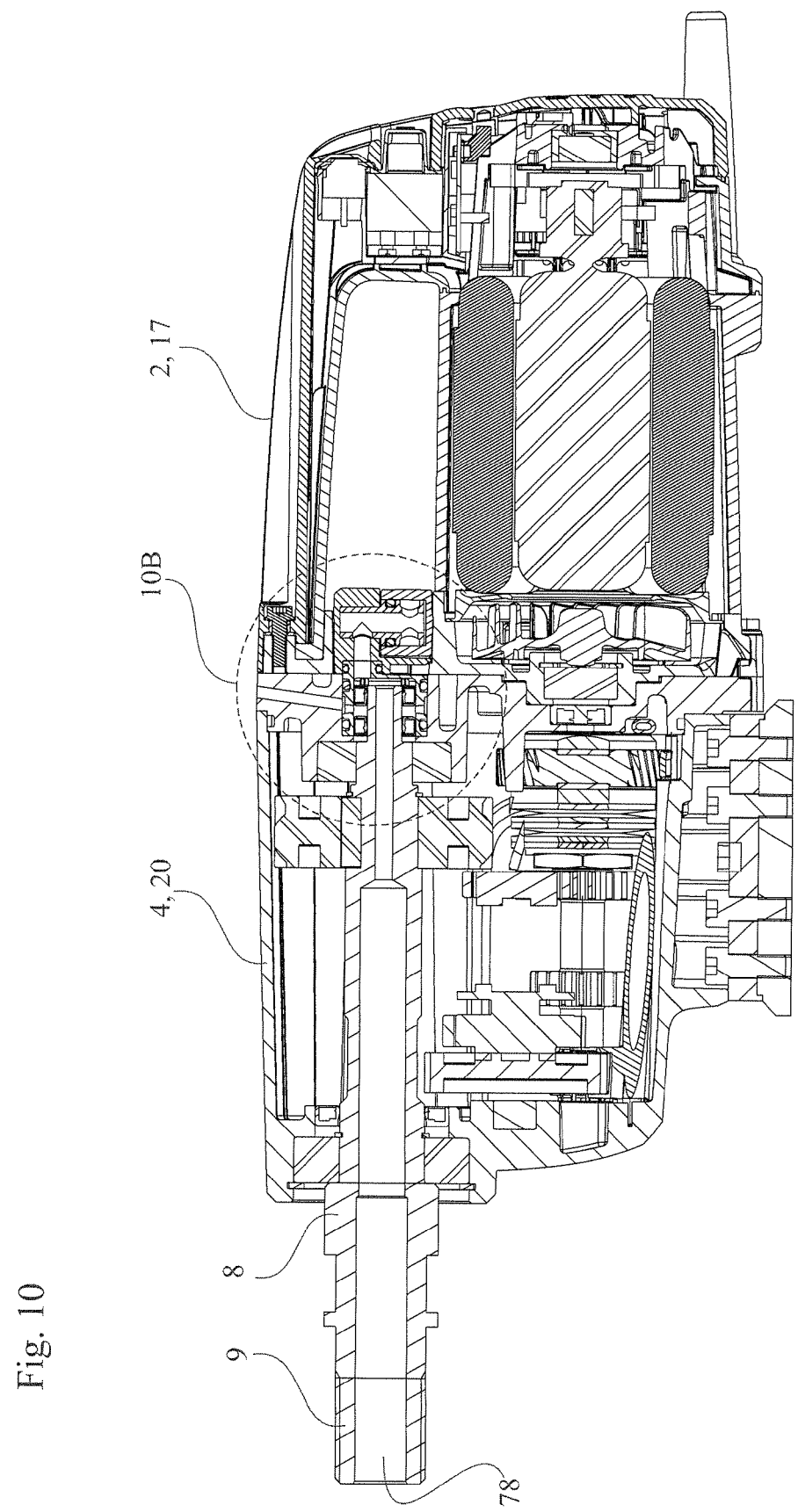

DRILLING MACHINE

TECHNICAL FIELD

The invention relates to a drilling machine comprising a drilling shaft, a driving motor in a motor housing, a gear box housing, a shaft driven by the motor and extending into the gear box housing, and a transmission in the gear box housing, between the shaft driven by the motor and the drilling shaft, in order to rotate the drilling shaft at a desired rotation speed. The invention relates particularly to a core drilling machine in which a working tool part consists of a core drill and water being arranged to be supplied to the tool during operation.

BACKGROUND OF THE INVENTION

Core drills are widely used within the contracting industry in order to make holes in walls, roofs and/or floors. In case these consist of bricks, concrete or the like, water must be supplied during work. Normally this takes place via a channel in the drilling shaft. Conventionally, the water is led into the channel of the drilling shaft via the front part of the gear box housing. This has some considerable drawbacks; firstly, the drilling shaft is large in this part of the transmission, which means that the radial lip seals that are necessary in order to prevent water leakage must be made correspondingly large, which in turn makes the sealing more difficult and results in the seals getting worn out relatively quickly due to the high circumferential speed of the drilling shaft in the sealed portion, and secondly, extensive dismantling of large portions of the gear box, the drilling shaft and/or the gear box housing is often required when the seals are to be exchanged.

Also in connection with the changing of bearings or other repair or maintenance operations, extensive dismantling must be performed in case of prior art core drilling machines, e.g. involving the emptying of oil from the gear box housing. In practice, extensive dismantling of the front parts of the core drilling machine, comprising the gear box housing, may be required also when repair or maintenance operations are to be conducted on the motor housing.

GB 883684 as well as 125733 shows an example of a drilling machine that results in many of these problems in connection with dismantling and repair. Both of these have a single and common end cover between the motor housing and the gear box housing.

BRIEF DESCRIPTION OF THE INVENTION

The object of the invention is to address the abovementioned complex of problems. According to a first aspect of the drilling machine according to the invention it is characterised in:

that a longitudinal outgoing channel is arranged in the drilling shaft for supply of water to a tool part that is connected or connectable to the drilling shaft, that a room between the motor housing and the gear box housing is arranged to be filled with water and to be water filled during operation of the drilling machine, that an incoming water conduit for filling water into said room extends from the outside and into said room, that a rear section of the drilling shaft extends into said water filled room between the motor housing and the gear box housing, and that the outgoing water conduit of the drilling shaft is in communication with said room, via said rear section of the drilling shaft that extends into said room, that said motor housing has a motor housing end cover and that said gear box housing has a gear box housing end cover.

The latter feature in particular will create opportunities for a simplified dismantling and changing of bearings and seals, e.g.

According to the embodiment, the drilling shaft hence extends without interruption through the entire gear box housing and into the water filled room between the gear box housing and the motor housing. In the embodiment, the invention makes use of the typical feature of conventional core drilling machines with gear boxes, that the diameter of the drilling shaft decreases stepwise over its extension through the gear box between the front and rear parts of the gear box housing, whereby a radial lip seal, that prevents the water from leaking from the water filled room and along the drilling shaft, can be arranged in the rear end portion of the drilling shaft that is of considerably smaller diameter than in the front portion of the gear box. Hence, the radial lip seal(s) that is/are arranged in this part of the drilling shaft can be relatively small, thus promoting sealing ability and life span.

By introducing the water required for the core drill steel in the rear end of the drilling shaft and letting it flow all the way through the gear box, the simultaneous effect is achieved that the gear box is chilled, which is an additional beneficial effect.

The inner part of the gear box housing, which is oil filled, and said water filled room, are separated from each other by the gear box housing end cover that according to the embodiment is detachably mounted, by screws, at the main part of the gear box housing. The rear portion of the drilling shaft as well as the front portion of the motor shaft extends through this end cover and into the water filled room and the oil filled gear box housing, respectively. According to one aspect of the invention, the gear box housing with its drilling shaft, gear box and gear box housing end cover, hereby forms a machine front unit that can be detached in its entirety from the rear portions of the drilling machine, comprising the motor and the motor housing. This will among other things result in the advantage that said radial lip seal(s) on the rear portion of the drilling shaft is/are easy to access without having to open the gear box housing.

According to another aspect of the invention, also the motor part of the drilling machine, comprising a motor housing with a motor, is made as a machine unit, more particularly forming a rear machine unit, whereby also the inner part of the motor housing is covered by an end cover, here called motor housing end cover, that is detachably mounted by a screw joint, i.e. analogous with the conditions for the gear box housing and its gear box housing end cover. According one aspect of the invention, the outgoing shaft driven by the motor extends through the motor housing end cover and the gear box housing end cover (in the following called gear housing end cover) and into the gear box housing and the transmission arranged therein. This means that according to one aspect of the invention, the water filled room can be formed between the motor housing end cover and the gear box housing end cover. According to this aspect of the drilling machine according to the invention it is thus in summary characterised in that the motor housing has a front, detachably mounted, motor housing end cover, that the gear box housing has a rear, detachably mounted, gear housing end cover, that the motor housing including its assembled motor housing end cover forms a rear machine unit, that the gear box housing including its assembled gear housing end cover forms a front machine unit in which all cog wheels are positioned after assembly, i.e. they are all positioned in front of the gear housing end cover, that the rear machine unit and the front machine unit can be interconnected, with said two machine end covers bearing against each other, and that the machine can be split by separating the two machine units from each other without disconnecting any of the end covers from its respective housing.

The water filled room according to the first aspect of the invention is preferably arranged between the motor housing end cover and the gear housing end cover. It is realised that this arrangement will additionally improve the possibility of servicing either one of the front machine unit and the rear machine unit without having to dismantle the unit that is not to be serviced at that particular occasion.

According to one aspect of the invention, the motor housing end cover and the gear housing end cover are in contact by peripheral contact surfaces that form a peripheral limit for the water filled room, in the following also called the water chamber, as well as by a central area in which the lead-through of the shaft driven by the motor is arranged. This means in other words that the water chamber is annular. By the motor housing end cover and the gear housing end cover being in mutual contact in the area of the lead-through, it is also possible to extend the motor-driven shaft through the end covers without contacting water, which in turn means that there is no need for a radial lip seal against water leakage on the shaft in question. Hence, the number of radial lip seals in order to prevent water leakage can be reduced only to the or those radial lip seals that are arranged to prevent water from flowing from the water chamber, along the drilling shaft and into the bearing of the drilling shaft in the area of the rear section of the drilling shaft and/or into the oil filled gear box housing.

The motor of the machine is preferably an electrical motor. It is a preferable object of the invention to design the drilling machine to be ergonomically advantageous. This means inter alia that the necessary electric cable and the water hose that is necessary for the water supply are led into the machine from the same direction, preferably from below, when the machine is directed with its drilling shaft horizontally arranged. By the water chamber being annular, it can be given a relatively large radial extension in the machine, i.e. transversal to the longitudinal direction of the drilling shaft, which means that water can be led into a lower portion of the annular water chamber, thus enabling a water inlet to the water chamber at a short radial distance from the underside of the drilling machine, which is a true constructional advantage. It is also possible to lead out the water from the water chamber, via the channel in the drilling shaft, at a position in the upper part of the annular water chamber, which constitutes an important adaptation to a beneficial positioning of the drilling shaft in the machine.

Additional aspects, characteristics and advantages of the invention will be clear from the appended claims and from a detailed description of a preferred embodiment.

BRIEF DESCRIPTION OF THE DRAWINGS

In the following, a preferred embodiment of the drilling machine according to the invention will be described with reference to the appended drawing figures, of which:

FIG. 9 shows an exploded view of a gear housing end cover, a sealing insert and the parts of the water conduit therefore, in accordance with a second embodiment of the invention, FIG. 10 shows an axial section of the drilling machine according to the second embodiment.

DETAILED DESCRIPTION OF A PREFERRED EMBODIMENT

Figure 1:
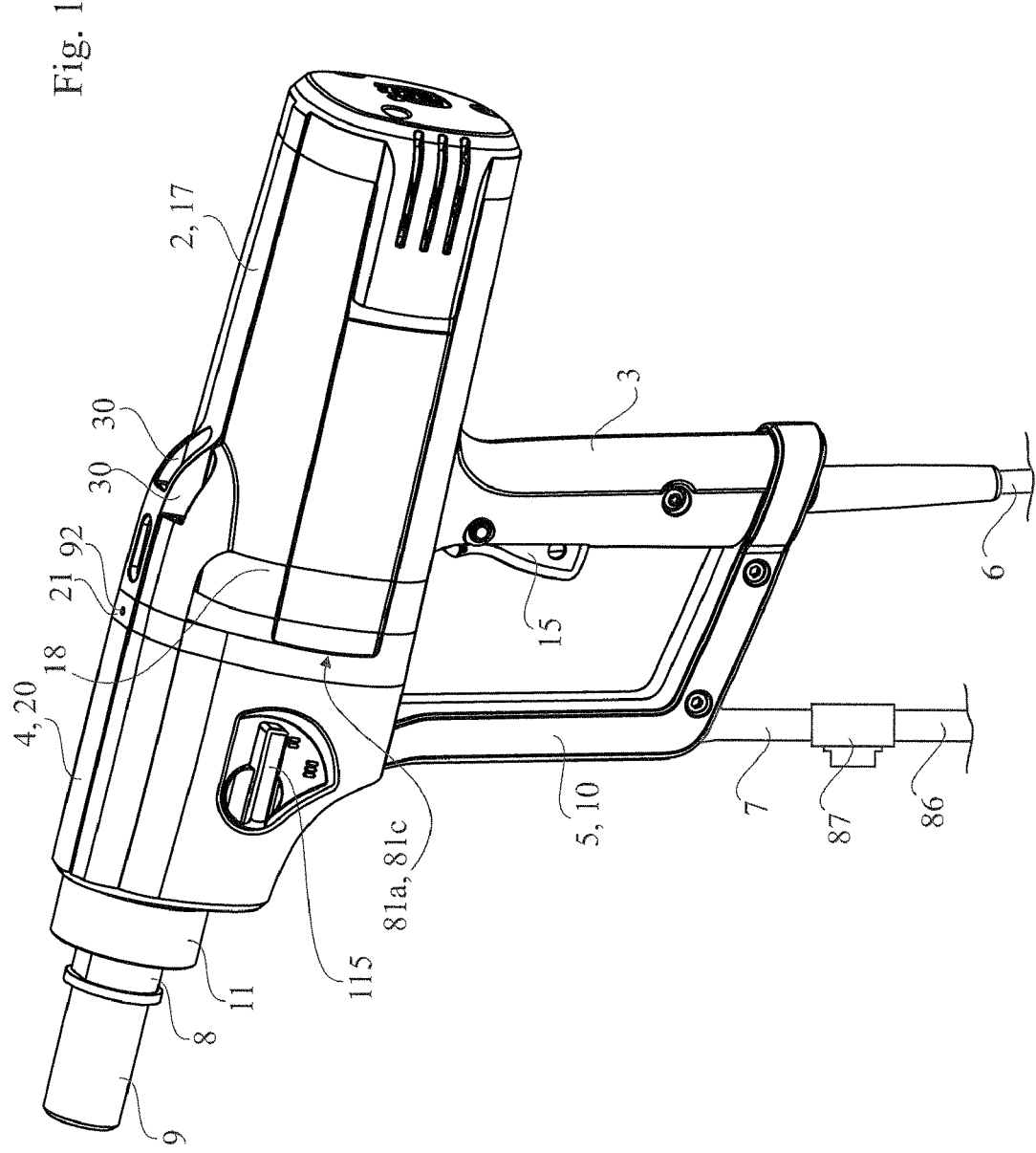
FIG. 1 is a view in perspective of a drilling machine according to a first embodiment of the invention.

Referring first to FIG. 1, a drilling machine according to the invention is generally denoted 1. Its principal parts are a rear unit 2 with a handle 3, and a front unit 4. A hand protector bow 5 extends between the lower end of the handle 3 and the underside of the front unit 4. An electrical cable 6 extends into the handle 3, from below. In parallel with the electrical cable 6, a water hose 7 extends from below and into a front portion 10 of the hand protector bow 5. A drilling shaft 8 has a front attachment 9 for accessories, to which attachment a core drill steel (not shown) or some other tool can be attached. A front handle can, as is known per se, be mounted to a cylindrical portion 11 of the front end of the front unit 4. The rear unit 2 houses an electrical motor 14 that can be manoeuvred by a switch or some other manoeuvring means 15 in the handle 3. A motor shaft that extends from the electrical motor 14 has been denoted 16. The electrical motor 14 is housed in a motor housing 17. A motor housing end cover that faces the front unit 4, has been denoted 18. The front unit 4 comprises a gear box housing 20, a gear box housing end cover 21 that faces the motor housing, and in the gear box housing 20 a gear box, here called transmission 22.

The motor housing end cover 18 of the rear unit 2 can be joined with the motor housing 17 by screws that extend with clearance through holes in the motor housing end cover 18 and that are screwed in threaded holes in the motor housing. Correspondingly, the gear housing end cover 21 can be joined with the gear box housing 20 in order to form the integral front unit 4, with screws extending with clearance through holes in the gear housing end cover 21 and being screwed to the gear box housing.

Figure 2:
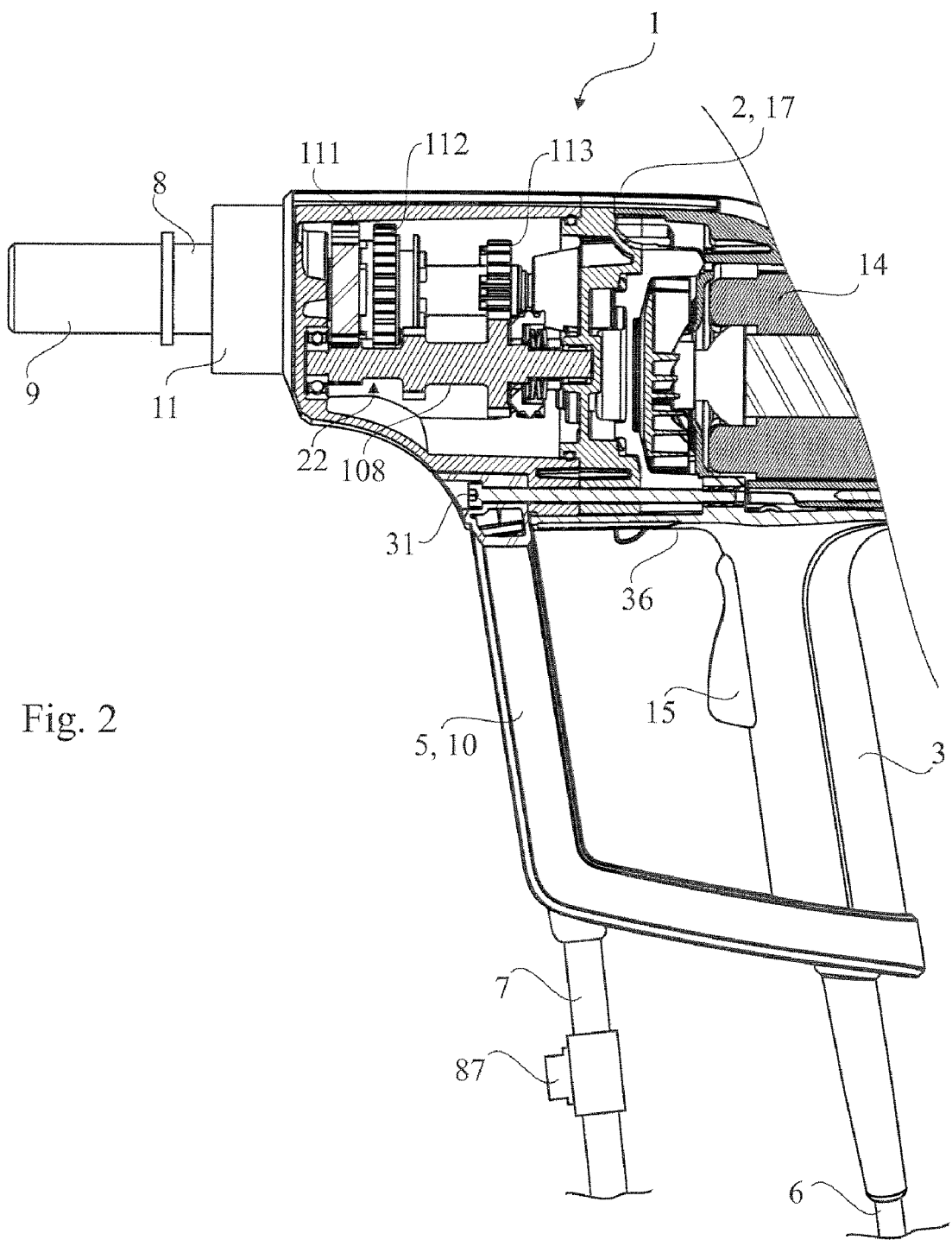
FIG. 2 shows the front and lower parts of said machine, partially in section.
Figure 3:
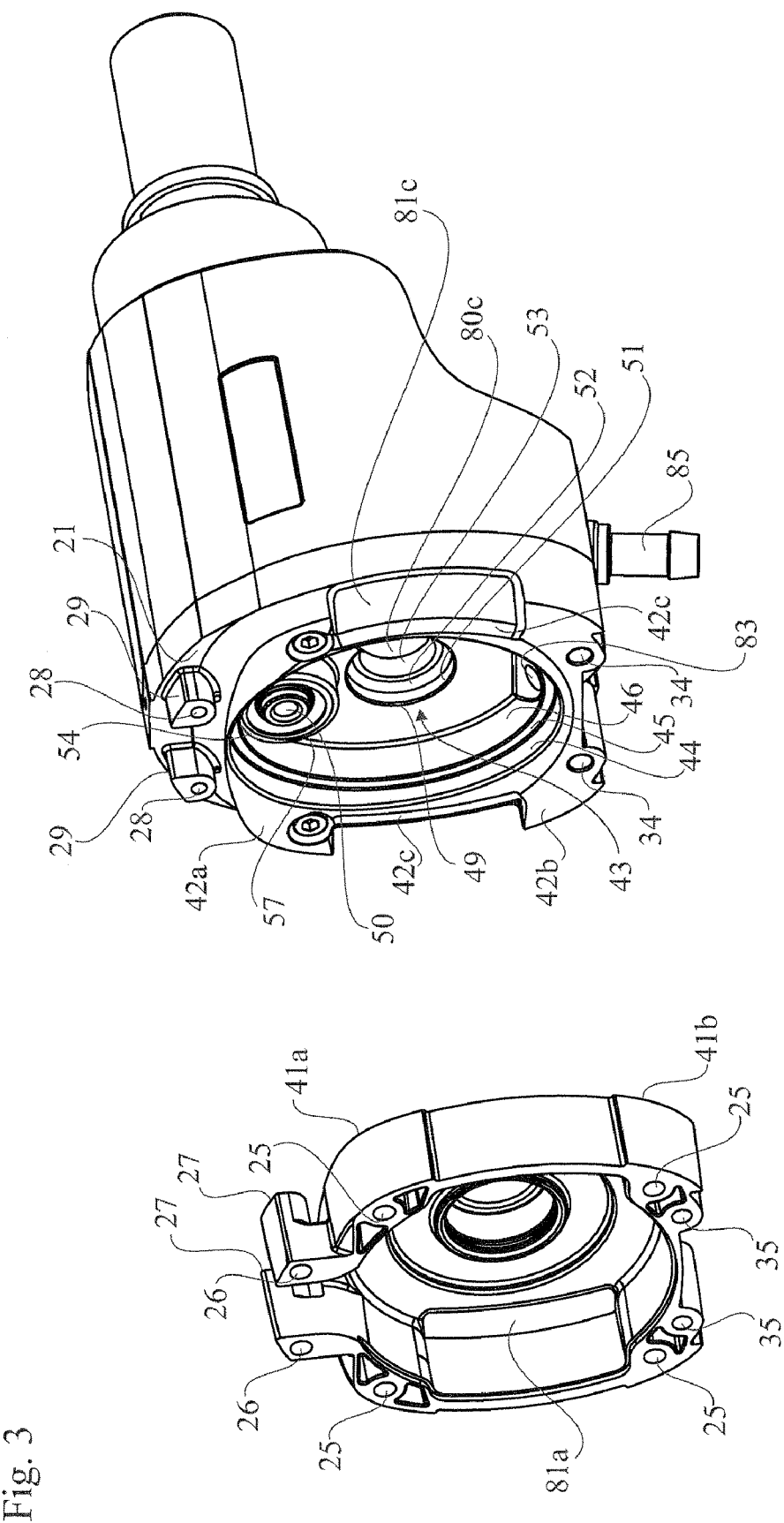
FIG. 3 shows an exploded view in perspective of a front machine unit and a motor housing end cover, as seen obliquely from the rear right and in accordance with the first embodiment.
Figure 4:
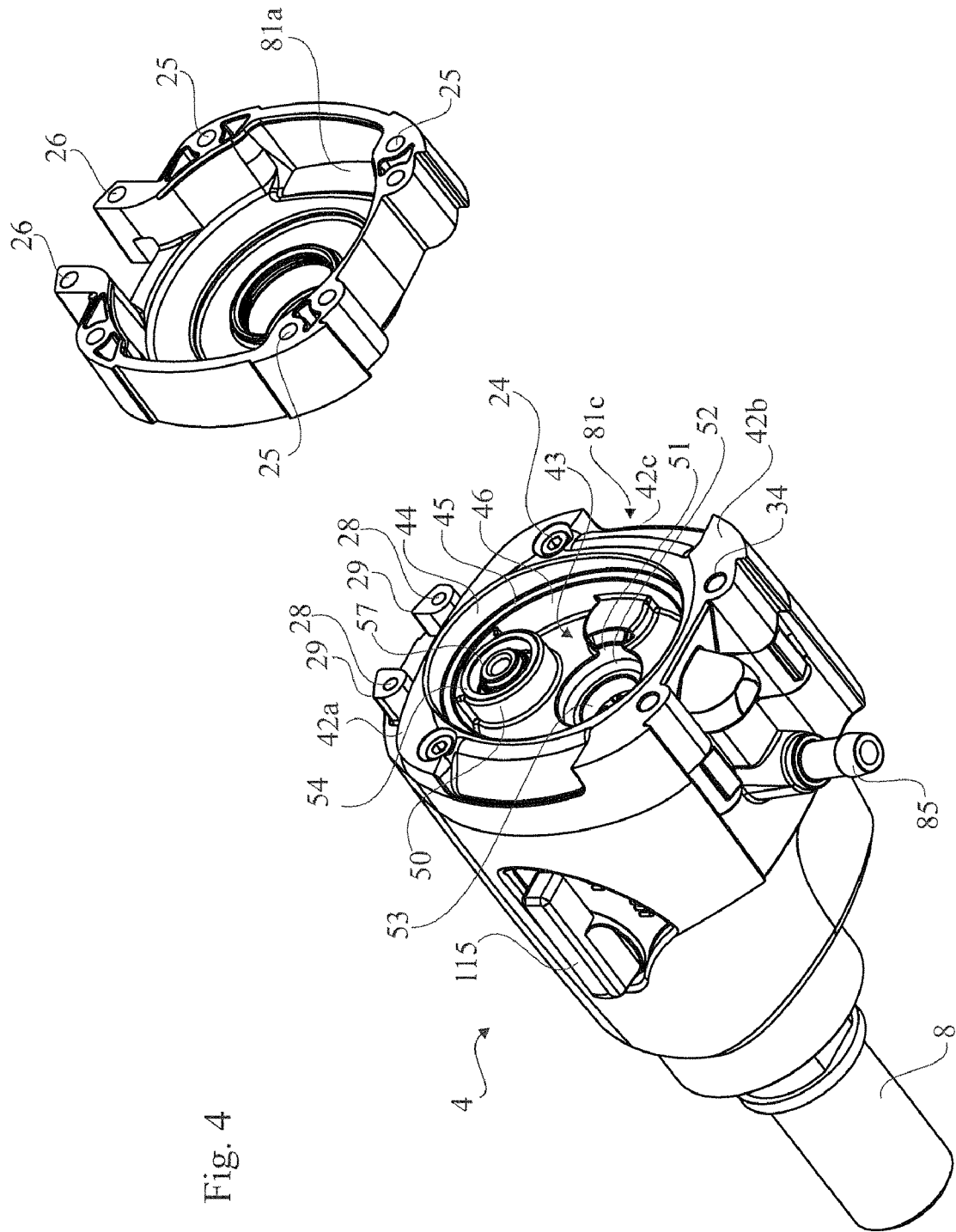
FIG. 4 shows the same machine unit and motor housing end cover as in FIG. 3, as seen obliquely from below, from the rear left.
Figure 6:
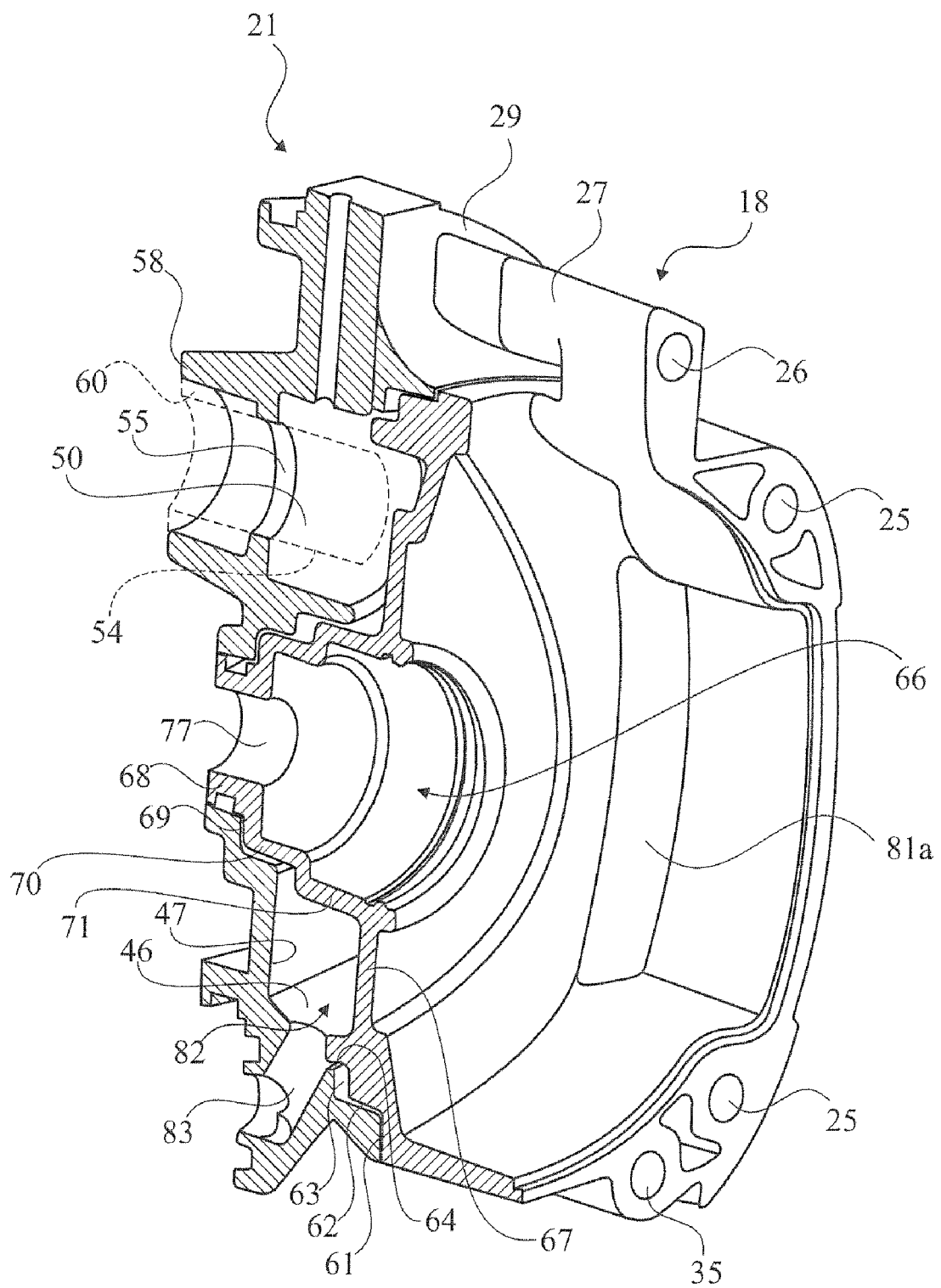
FIG. 6 shows, in a view in perspective obliquely from the rear left, an axial section of the motor housing end cover and a gear housing end cover, brought in abutment with each other, according to the first embodiment of the invention.
Figure 7:
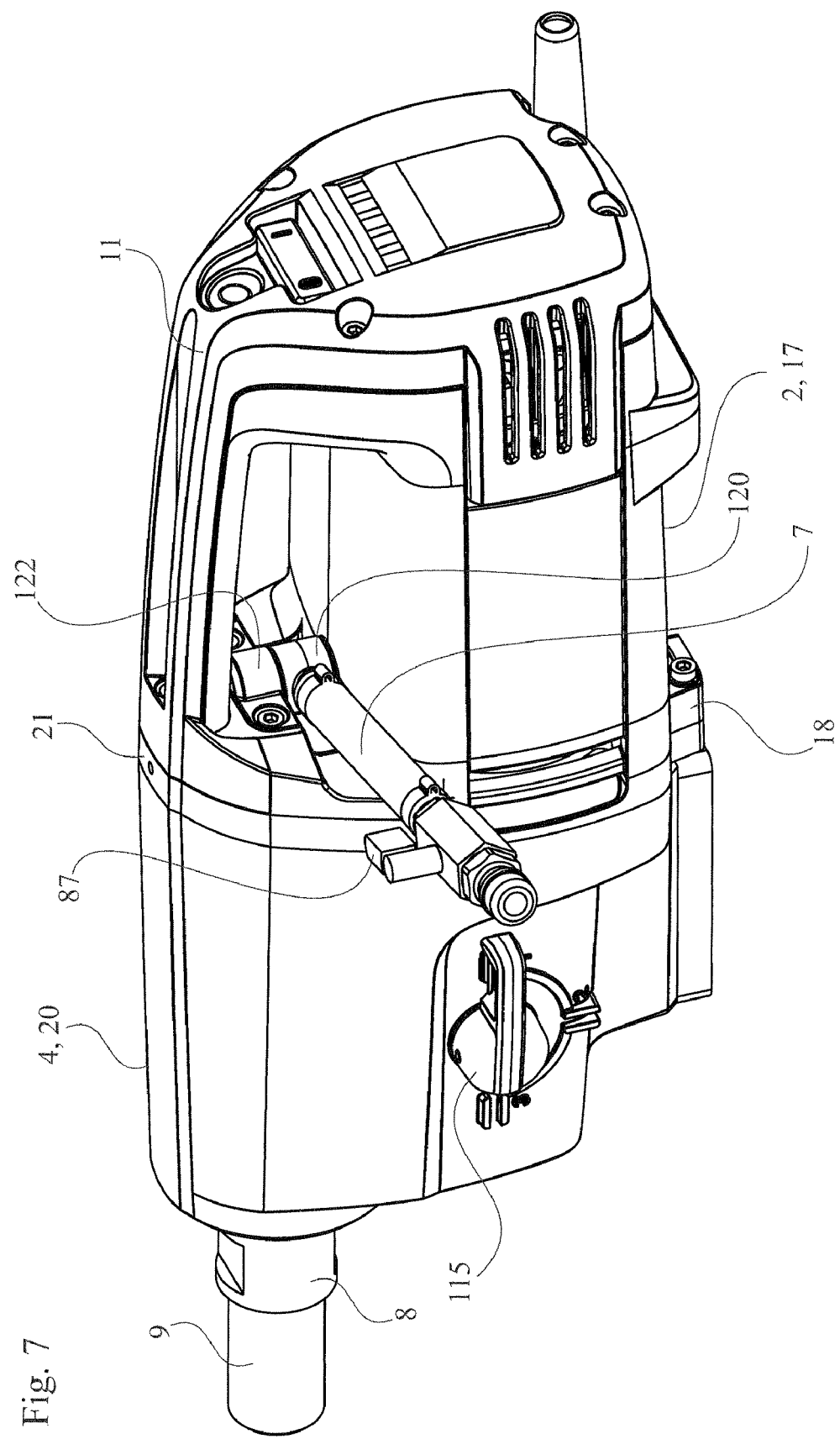
FIG. 7 is a view in perspective of a drilling machine according to a second embodiment of the invention.
Figure 8:
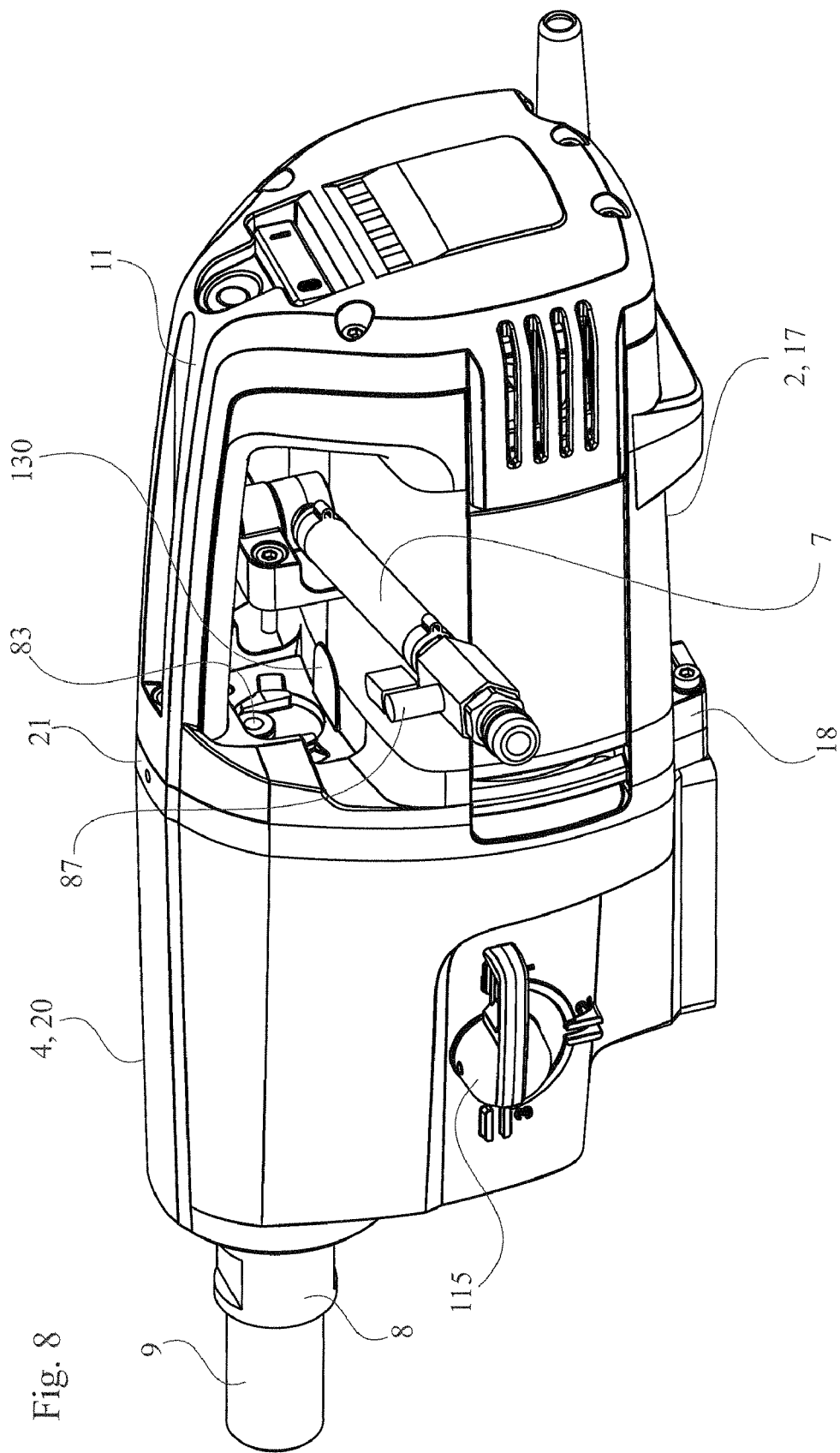
FIG. 8 is a view in perspective of the same drilling machine as in FIG. 7, in which the water conduit has been detached.

Referring to FIGS. 3 and 4, the gear housing end cover 21 is accordingly joined with the gear box housing 20 by a number of not shown screws, in order to form the front unit 4. A number of first screw holes for these screw joints have been denoted 24. Correspondingly, the motor housing end cover 18 can be joined with the motor housing 17 by screw joint. A number of second holes, through which screws can extend with clearance to join the motor housing end cover 18 with the motor housing 17, have in FIGS. 3 and 4 been denoted 25. The thus assembled front unit 4, comprising the gear box housing 20 and the gear housing end cover 21, can by additional screws be joined with the assembled rear unit 2 that comprises the motor housing 17 and the motor housing end cover. Accordingly, a pair of third mounting screws extends with clearance through third screw holes 26 in protrusions 27 on the upper side of the motor housing end cover 21 and through fourth screw holes 28 in the upper part of the gear housing end cover 21. The said fourth screw holes 28 extend through protrusions 29 on the gear housing end cover 21, which protrusions 29 abut against the protrusions 27 on the motor housing end cover 18, when the machine is assembled, FIG. 6. Accordingly, said third mounting screws for the joining of the rear unit 2 with the front unit 4 extend from the back, first through the third clearance screw holes 26 in the previously assembled motor housing end cover 18, and then through the screw holes 28 in the also previously assembled gear housing end cover 21 and into threaded holes in the gear box housing 20. A couple of screwdriver recesses 30 are provided on the upper side of the motor housing 17. On the underside, a couple of fourth mounting screws 31, FIG. 2, extend with clearance through holes in the gear box housing 20, and then with clearance through fifth holes 34 in the gear housing end cover 21 and sixth holes 35 in the motor housing end cover 18, in order finally to be screwed into threaded screw holes 36 in the motor housing 17, FIG. 2.

In the mounted assembly, the gear housing end cover 21 abuts edge to edge against circumferential rear edge of the gear box housing 20, such that the outside of the gear box housing 20 passes smoothly to the outside of the gear housing end cover 21, FIGS. 3 and 4. The front circumferential edge of the motor housing end cover 18 abuts against a portion that protrudes backwards below the protrusions 29. The surfaces that face the motor housing end cover 18, against which the motor housing end cover 18 abuts by planar edge portions 41a, 41b, have been denoted 42a and 42b, respectively. The surfaces 42a and 42b and recessed portions 42 that are positioned them between, together form the edge of a dish-shaped depression 43 in the gear housing end cover 21, which accordingly has a concave side that faces the motor housing end cover 18. The depression 43 lowers itself stepwise down from the edge-forming surfaces 42a, 42b, 42c. First, there is a cylindrical or possibly slightly conical first wall portion 44, followed in order by an annular first shelf 45, a second cylindrical wall portion 46 that is considerably much longer than the first wall portion 44, as well as a bottom 47 that is planar or slightly sloping towards the centre. The circumference of the bottom is oval with its longitudinal axis coinciding with the vertical plane that forms the plane of the section in FIG. 6.

Figure 5:
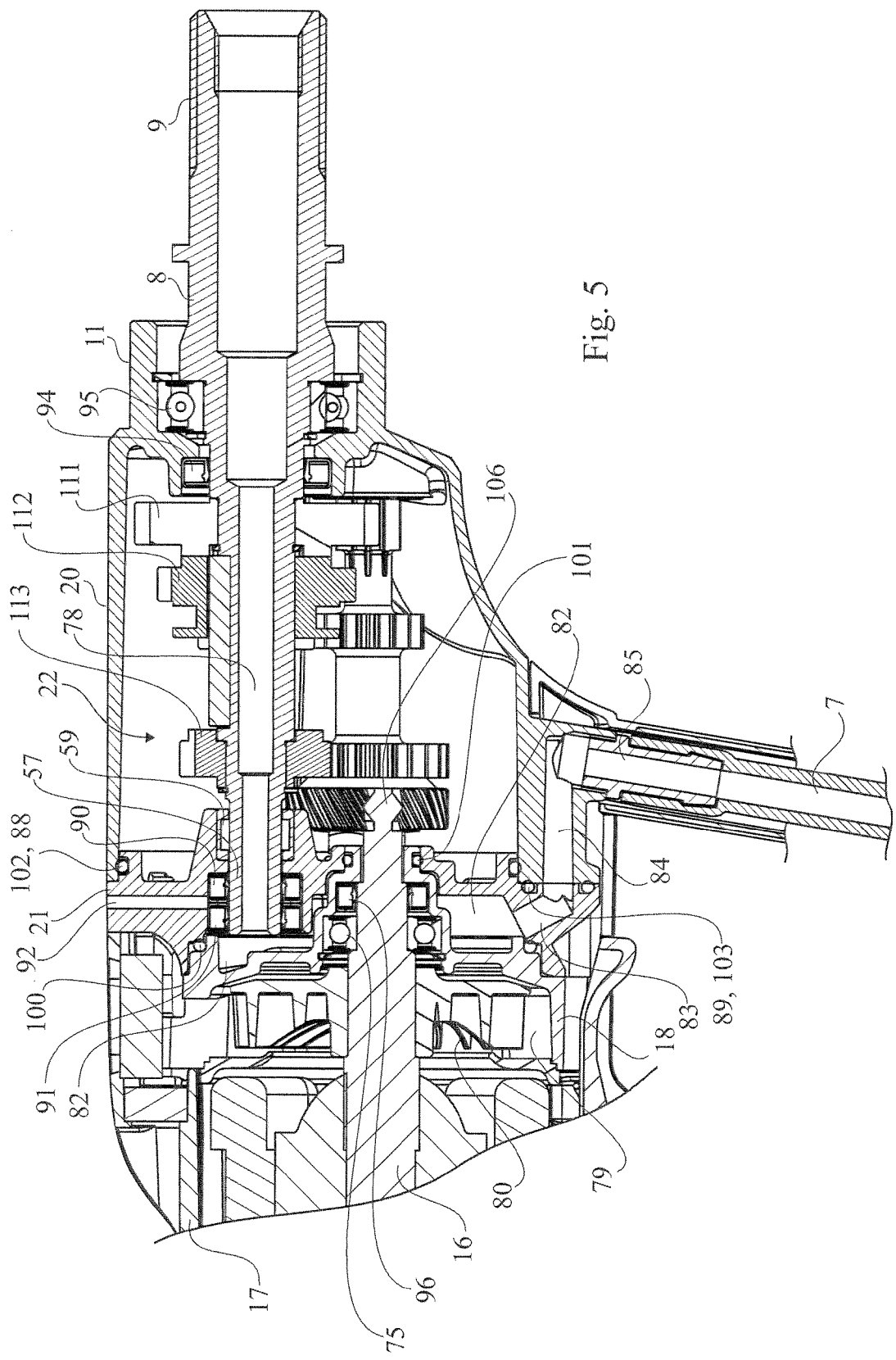
FIG. 5 shows an axial section of the parts of the drilling machine that are most essential for the understanding of the invention, according to the first embodiment of the invention.

In the bottom 47 there is a countersinking 49 that also is stepped as well as a cylindrical sleeve-shaped projection 50. The countersinking 49 exhibits, as seen from the bottom 47, a third cylindrical or slightly conical wall portion 51, a planar or slightly conical annular shelf 52 and, at the very bottom, a cylindrical or slightly conical through hole 53. The rearmost section 57 of the drilling shaft 8 extends through a cylindrical hole 55 in the gear housing end cover 21, FIGS. 3-5, coaxially with the cylindrical sleeve-shaped projection 50 and backwards to level with the upper edge of the projection 50, such that an annular groove 54, FIG. 6, with cylindrical walls is formed between the inside of the projection 50 and the outside of the drilling shaft section 57. This annular groove 54 has been marked by dashed lines in FIG. 6. The gear housing end cover 21 exhibits, on its opposed convex side, a sturdily dimensioned projection 58 that has a bore in the form of the hole 55, thus prolonging the hole 55. Hereby, the projection 58 forms an annular seat 60 for a needle bearing 59 for the drilling shaft portion 57. Similar to the annular groove 54, the annular seat 60 has been marked by dashed lines in FIG. 6.

The side of the motor housing end cover 18 that faces the gear housing end cover 21 has a convex shape that matches the concave side of the gear box housing, such as will be explained in the following. Accordingly, said side of the motor housing end cover 18 exhibits a third shelf 61, FIG. 6, which in the assembled drilling machine 1 abuts against the planar end surface or edge 42 of the gear housing end cover 21, a fourth cylindrical or slightly conical wall portion 62, which abuts against the first wall portion 44 of the gear housing end cover, a fourth shelf 63 at a slight distance from the first shelf 45 of the gear box housing, and a fifth cylindrical or slightly conical wall portion 64, which abuts a short distance against the second wall portion 46 of the gear housing end cover.

Concentrically with the countersinking 49 of the gear housing end cover, the motor housing end cover 18 exhibits a projecting, stepped, tapering portion 66 on its convex side. Between the projecting portion 66 and the peripheral portions of the gear housing end cover, the gear housing end cover 18 exhibits a waist at a considerable distance from the bottom 47 of the gear housing end cover 21. The projecting portion 66 on the motor housing end cover is, by its front steps, inserted in the countersinking 49 of the gear housing end cover. Accordingly, a sixth cylindrical or slightly conical wall portion 68 abuts against the cylindrical wall in the hole 53 in the gear housing end cover, a fifth shelf 69 abuts against said second shelf 52 in the countersinking 49 of the gear housing end cover, while a seventh cylindrical or slightly conical wall portion 70 abuts against the third wall portion 51 of the countersinking 49. An eighth cylindrical wall portion 71, that is concentric with the other wall portions of the projecting portion 66 of the motor housing en cover, follows thereafter and has a slightly larger diameter than the just mentioned seventh wall portion 70. This eighth wall portion 71 forms a seat for a ball bearing 75 for the motor shaft 16, FIG. 5. The final portion of the motor shaft 16 extends into the gear box housing 20, via a cylindrical through hole 77 in the final part of the projecting portion 66 of the motor housing end cover 18, which final part forms said sixth wall portion 68.

A disc-shaped room 79 is formed on the concave side of the motor housing end cover 18, serving as a fan chamber and housing a fan 80 for the cooling of the electrical motor 14. Inlet and outlet air openings 81a in the fan chamber 79 are arranged in the wall of the motor housing end cover, communicating with recesses in both sides of the gear housing end cover.

The motor housing end cover 18 is in contact with the gear housing end cover 21, in the circumferential area where the annular edge 65 of the motor housing end cover 18 abuts against the gear housing end cover, as well as in the central area where the surfaces 68, 69, 70 of the wall and shelf portions of the motor housing end cover abut against the wall of the hole 53, said second shelf 52 and said third wall portion 51 in the gear housing end cover 21. Between said peripheral and central contact areas there is accordingly formed, between the motor housing end cover 18 and the gear housing end cover 21, i.e. between the rear 2 and front 4 units of the drilling machine 1, an annular space 82 that is to be water-filled when the drilling machine is in operation. Hence, said space 82 is denoted water chamber. This annular water chamber is oval, as is the bottom 47, and its extension is longer in the vertical direction than in the transversal direction. The walls of the water chamber 82 are formed from the bottom 47 of the gear housing end cover 21, the waist 67 of the motor housing end cover 18, said eight wall portion 71 that forms part of the projecting portion 66 of the motor housing end cover, and the peripheral parts of the motor housing end cover 18 and the gear housing end cover 21 that are pressed against each other in the assembled drilling machine 1.

The water chamber 82 has a bore inlet 83 that extends obliquely through the bottom of the gear housing end cover 21, FIGS. 3 and 4, and mouths in the bottom portion of the annular water chamber, which means the part of the water chamber close to the underside of the drilling machine 1, when the drilling machine is oriented with its drilling shaft horizontal. A moulded channel 84 extends to the inlet 83, in an axial direction in the bottom of the gear housing end cover 20, and a distance further through the gear housing end cover 21 and up to the inlet portion 83, and a nipple 85 extends to the channel 84, to which nipple the water hose 7 is connected. A connecting hose for the tap 87 is denoted 86. The water hose extends through the downwardly directed part of the hand protector bow 5 and below the hand protector bow there is a tap 87 for connection and disconnection and for control of the water flow. The oval, annular shape of the water chamber enables the water chamber to have a considerable vertical extension between the rear unit and the front unit. This also means that the channels that extend through the lower part of the machine have a very short vertical extension, which is favourable from a constructional point of view.

The drilling shaft 8 is tubular. Accordingly, a channel 78 extends through the drilling shaft 8 all the way from an inlet in the end of the rear section 57 of the drilling shaft, which projects into the annular water chamber 82 in the area of the cylindrical projection 50 that accordingly also projects into the annular water chamber 82, more precisely in the upper part of the water chamber at a level above the axis of rotation of the motor shaft 16. The oval annular shape of the water chamber 82—more precisely essentially an "oval torus shape"—has also in this connection relevance to a beneficial constructional design, in that the water can be led directly into the through channel 78 in the drilling shaft, from the upper part of the water chamber 82 not far from the upper side of the drilling machine, where it is desirable also for the drilling shaft to be positioned. Initially, the water channel 78 in the drilling shaft 8 has a relatively small cross-section in the area of the rearmost section 57 of the drilling shaft, but it widens gradually as the diameter of the drilling shaft increases stepwise in the area of the transmission 22.

The gear box housing 20 contains oil, the water chamber 82 contains water and the fan chamber 79 contains air. The devices are arranged to prevent the fluids in said rooms from getting in contact with each other and to prevent that water or oil leak out into the environment. Generally it is most difficult to seal gaps between moving and stationary machine parts. Accordingly, water must be prevented from leaking out from the water chamber 82 to the environment or to the needle bearing 59 and further to the gear box housing 20, along the rearmost section 57 of the motor shaft. The motor shaft is not in contact with water since the projecting end portion 68 of the motor housing end cover 18, which end portion houses the motor shaft opening 77, extends to the inside of the gear box housing 20 via the hole 53 in the gear housing end cover 21. Hence, no water sealing radial lip seal is required on the motor shaft 16. On the other hand, oil should be prevented from leaking backwards from the gear box housing along the rearmost section 57 of the motor shaft, or forwards to the surroundings of the front part of the gear box housing 20.

A leakage of water and/or oil in the area of the rearmost section 57 of the drilling shaft is counteracted by the rearmost section 57 of the drilling shaft being small in diameter, which means that also the peripheral speed of the shaft is correspondingly low in this area, something that facilitates the sealing and/or prolongs the life span of the sealing. According to the embodiment there are two radial lip seals in this area; a first radial lip seal 90 in the bottom of the annular groove 54 in the cylindrical projection 50, which encircles the rearmost section 57 of the drilling shaft, and a second radial lip seal 91 arranged in the same groove 54 outside of and abutting the first radial lip seal 90. Said second radial lip seal 91 extends to the edge of the cylindrical projection 50. The first radial lip seal 90 should primarily prevent oil from leaking backwards along the drilling shaft, while the second radial lip seal 91 should stop water from leaving the water chamber 82 along the drilling shaft. These terms can be fulfilled by the problem solution according to the invention, implying among other things that the sealing is made in a section of the drilling shaft where the diameter of the shaft is small. For safety reasons, there is however arranged a telltale channel 92 that extends from the parting line between the radial lip seals 90, 91, to the outside of the machine, where it is easy to see on the upper side of the machine, for detection of possible water and/or oil leakage.

The assembled drilling machine 1 contains two additional radial lip seals. In the front part of the gear box housing 20, in the front unit 4, there is a radial lip seal 94 that seals against the drilling shaft 8 between the transmission 22 and a front, sturdy ball bearing 95 on the outgoing drilling shaft, where it has a considerably larger diameter than in its rearmost section 57.

On the motor shaft 16, in front of the ball bearing 75, there is a radial seal 96 that prevents oil from leaking from the gear box housing 20 and into the fan chamber 79. Thus, the only radial lip seals in the assembled drilling machine 1 that abut against moving machine parts and that seal against water leakage, are the radial lip seals 91 and 90, primarily said second radial seal 91 on the rearmost section 57 of the drilling shaft having a small diameter and hence a low peripheral speed of the drilling shaft. Both of these two seals are easy to access by detaching the rear and front units 2 and 4, respectively, from each other, which is easy to accomplish by unfastening the screw joints that keep the two units together. Hence, changing of the first and second radial lip seals 90, 91 does not require any extensive disassembly, since the rear unit 2 as well as the front unit 4 can remain intact during such maintenance.

O-rings are used to seal between stationary machine elements in the drilling machine 1. Accordingly, a first O-ring 100 is provided to prevent water leakage between the motor housing end cover 18 and the gear housing end cover 21. More precisely, the O-ring 100 is arranged between said fourth shelf 63 on the motor housing end cover 18 and said first shelf 45 on the gear housing end cover. A second O-ring, for preventing water or oil leakage, is arranged in an annular groove 73 in said sixth wall portion 68 of the motor housing end cover 18, sealingly against the through hole 53 in the gear housing end cover 21. A third O-ring is arranged in an annular groove 88 in the gear housing end cover 21, to prevent water leakage from the channel 84 in the parting line between the gear box housing 20 and the gear housing end cover 21. A fourth O-ring 103 is arranged in a groove 89 in the gear housing end cover 21 in order to seal between the gear housing end cover 21 and the inside of the gear box housing wall.

In an alternative embodiment for the water supply, the supply and the discharge of water to and from, respectively, the water chamber 82 could at least partly be arranged by a channel inside the motor shaft 16, i.e. the shaft 16 driven by the motor. This can be arranged by instead connecting the water hose 7 to the rear part of the drilling machine and by providing a channel that leads to a water chamber that encircles a portion of the rear part of the motor shaft. One or two radial lip seals prevent leakage along the motor shaft. The channel inside the motor shaft leads the water to the front part of the motor shaft, where it is transferred to the water chamber 82. This can take place e.g. by one or more radial holes arranged in front of the seal 96 but behind a similar additional seal that connects to the channel inside the motor shaft. Naturally, the channel ends after the latter connection, such that all water is led out between the two seals and further to the water chamber 82.

In the end of the motor shaft 16 that projects into the gear box housing 20, through the two end covers 18 and 21, there is a driver 106 in the form of a small cog wheel arranged via a sliding clutch to drive a transmission shaft 108 parallel with the drilling shaft 8 and part of the gear box/transmission 22, as is known per se. The gear box has three gears. Without describing the known design of the transmission in detail, it should be mentioned here that the drilling shaft, as seen from the front, has a first cog wheel 111 for the first gear, a second cog wheel 112 for the second gear and a third cog wheel 113 for the third gear, FIGS. 2 and 4. The cog wheel 112 of the second gear is connected to the motor shaft via a cotter joint and is by a handle 115 on the outside of the drilling machine displaceable between the cog wheels 111 and 113 of the first and the third gear, respectively, FIG. 1, FIG. 4. Depending on the position of the handle 115, the torque of the motor shaft is transmitted via the sliding clutch and the transmission shaft 108 and the cog wheels of the transmission shaft, to the cog wheels of the first, second and third gears, respectively, in order to rotate the drilling shaft at a desired rotation speed. It is typical for this known transmission that the drilling shaft forms an integral part of the transmission and that it has a stepped decreasing diameter with the smallest diameter in the rearmost section 57, a circumstance that is utilised according to the invention in order to lead water all the way through the drilling shaft, thereby to cool the gear box, at the same time as the sealing problems can be satisfactorily solved, also for the bearings that might be exposed to a chance of water penetrating into the bearing/bearings. In use, water is led in via the water hose 7 that extends through the front portion 10 of the hand protector bow 5, via the nipple 85 into the channel 84 and the inlet 83 into the lower part of the annular water chamber 82, between the motor housing end cover 18 of the rear unit and the gear housing end cover 21 of the front unit 4. From the water chamber 82, the water is pressed into the channel 78 inside the tubular rotary drilling shaft 8, in order finally to discharge into the front end of the drilling shaft where a tool, preferably a core drill steel, is attached.

If the drilling machine is to be disassembled for maintenance, the tap 87 is closed and there after the feeding hose is detached. After that, the tap 87 is opened once again and the machine is emptied of water simply by letting the water flow out via the open hose 7 and/or via the front end of the drilling shaft. There after, the screws are unfastened, which join together the rear unit 2 and the front unit 4, which units there after can be taken apart from each other. In case the maintenance involves nothing more that changing of any one of said first and second radial lip seals 91, 90, no additional disassembly is required. If something is to be taken care of inside the motor housing, the inside of the motor housing can be made accessible by detachment of the motor housing end cover 18, while the front unit 4 remains intact. If, on the other hand, something needs to be taken care of in the front unit, such as a changing of the needle bearing 59, the gear housing end cover 21 is detached, while the rear unit 18 in this case remains intact.

FIG. 7-10A show a second embodiment of a water-cooled drilling machine 1 according to the present invention. The same reference numerals are used for parts in the second embodiment that correspond to parts in the first embodiment according to FIGS. 1-6. The drilling machine 1 according to the second embodiment is intended to be positioned on a drilling stand with a transport handle 11 that is used for transporting of the drilling machine. The transport handle 11 also acts as an outer protection for the connection of the water hose to the gear housing end cover 21. In this embodiment, no water chamber 82 is formed between the gear housing end cover 21 and the motor housing end cover 18, but instead the water chamber 82 is provided in the sealing insert 123 that is inserted in the hole 55 of the gear box and cover 21.

Figure 10A:
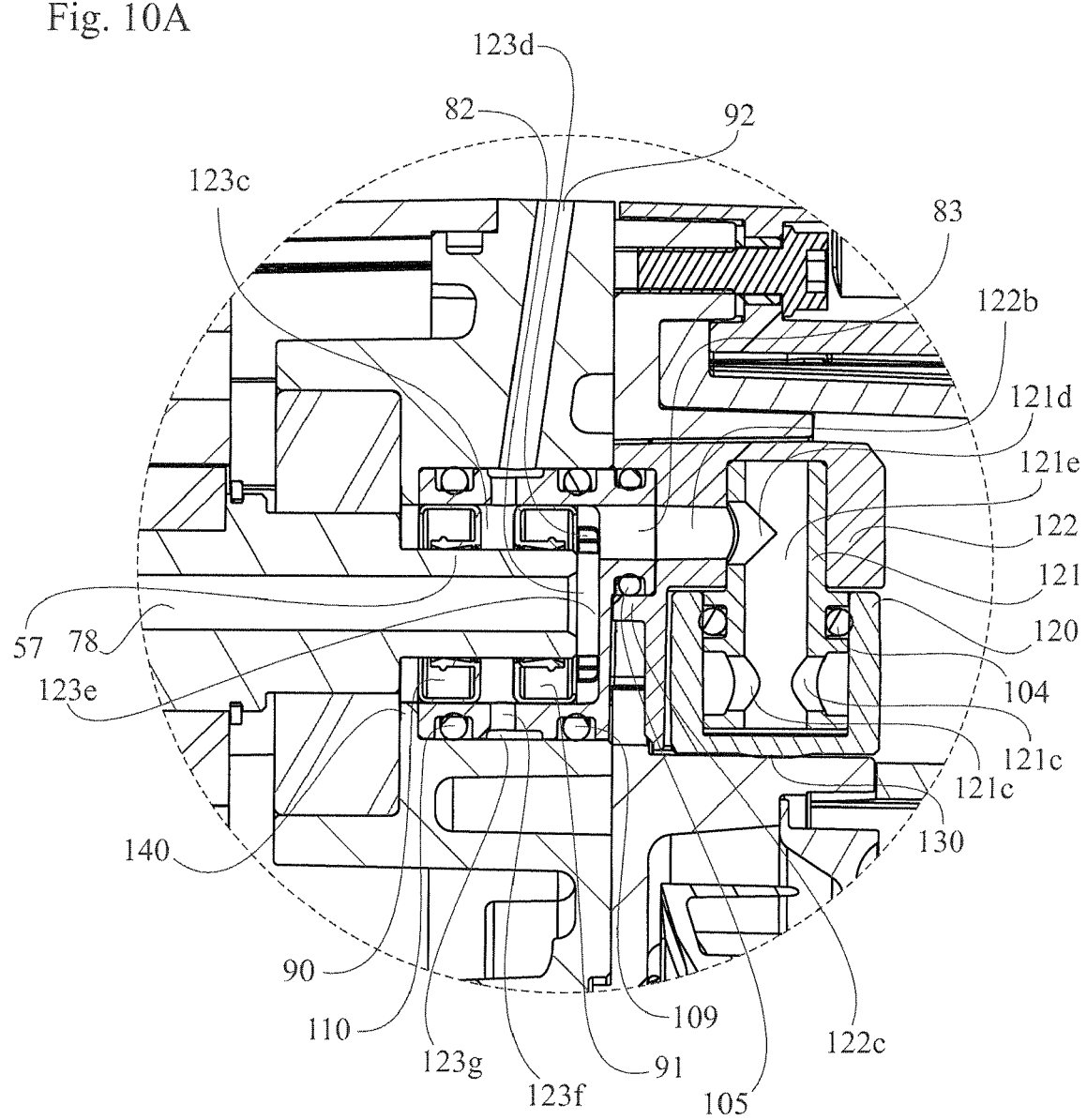
FIG. 10A shows an enlarged portion of the section in FIG. 10, which shows the drilling shaft, the sealing insert and parts of the water conduit for the sealing insert.

Studying now FIGS. 9 and 10A, it can be seen that the channel 84 is provided by first, second and third channel parts 120, 121, 122. The first channel part 120 has a channel opening 120a, i.e. the inlet opening for channel 84, which is provided with a nipple 85 for connection of the water hose 7. The channel opening 120a leads radially into a cylindrical room 120b. The cylindrical room 120b is open in its one axial direction where the lower part 121b of the second channel part 121 is arranged to be inserted. The second channel part 121 has a cylindrical internal 121e that forms part of the channel 84 and consists of an upper part 121a with a radial outlet opening 121d (concealed in FIG. 9) and a lower part 121b with radial inlet openings 121c. A fifth O-ring 104 separates the lower part 121b from the upper part 121a. The lower part 121b is arranged to be inserted in the opening in the axial direction of the cylindrical room 120b so that the lower part 121b reaches the bottom of the cylindrical room 120b, whereby the fifth O-ring 104 is arranged to end up at the opening in the axial direction of the cylindrical room 120b in order to seal against water leakage. The diameter of the lower part 121b is smaller than the cylindrical room 120b, whereby a chamber that is sealed off by the fifth O-ring 104 is formed between the lower part 121b and the walls of the inner cylindrical room 120b. This arrangement results in that the first channel part 120 can be turned about the axis of its cylindrical room 120b at the same time as the channel 84 is kept open. In operation, the first channel part 120 is prevented from unfastening due to vibrations thanks to the support 130 at the upper side of the motor housing end cover 18.

The upper portion 121a of the second part 121 is fixed in the third channel part 122, in a corresponding inner cylindrical room 122a of the third channel part 122, such that the radial outlet opening 121d meets an outlet 122b from the third channel part 122, which outlet extends radially from the inner cylindrical room 122a. The outlet 122b from the third channel part 122 is arranged to meet the inlet 83 of the sealing insert 123 when the third channel part 122 is fitted onto a projecting cylindrical connection part 123a of the sealing insert 123, whereby a flange 122c of the third channel part 122 encircles the connection part 123a and a sixth O-ring 105 seals against leakage. In the connection part 123a, the inlet 83 leads to a cylindrical internal 123c inside the cylindrical basic body 123b of the sealing insert.

The cylindrical basic body 123b of the sealing insert is adapted to fit in the hole 55 in the gear housing end cover 21 and is prevented from turning about its own axis by the sealing insert 123 being provided with two radial bulges 123i (of which one is shown in FIG. 9), which radial bulges 123i are adapted to match the guide grooves 131 at the hole 55.

Thereby, a position that is fixed from a turning point of view, of the sealing insert 123, is achieved after it has been fitted into the hole 55. The sealing insert 123 can be inserted in the hole until a lip 140 of the gear housing end cover 21 at the distal end of the hole 55 prevents continued insertion in the direction towards the tool end 9. The sealing insert 123 is also provided with a pair of wing elements 123h that are adapted at the maintenance of the sealing insert 123 to facilitate that said sealing insert 123 is prised off said gear housing end cover by e.g. a screwdriver. The third channel part 122 is attached to the gear housing end cover 21 by screws 141 and also prevents the sealing insert 123 from moving in the direction away from the tool end 9 during operation, i.e. the sealing insert 123 is kept in axially in place by the lip 140 of the gear housing end cover 21 and by the by screws attached third channel part 122.

The cylindrical internal 123c of the sealing insert is provided with a grip fitted second radial seal 91 that is inserted in the cylindrical internal 123c until four spacer shoulders 123d (of which two are seen in FIG. 10 and the number of course can be varied) prevents further pressing in of the second radial seal 9 towards the closed end 123e of the cylindrical internal 123c, the end to which the inlet 83 connects. A grip fitted first radial seal 90 is furthermore inserted such that it ends up edge to edge with the open end of the cylindrical internal 123c, such that a room is formed between the radial seals 90, 91. When the sealing insert 123 is inserted in the hole 55, as in FIG. 10A, the lips of the radial lip seals 90, 91 encircle the rear section 57 of the drilling shaft 8. The end of the rear section 57, in which the channel 78 of the drilling shaft has one of its mouths, is adapted to end up at a distance from the closed end 123e of the cylindrical internal 123c, just as the other radial seal 91, such that a room, the water chamber 82, is formed there between.

The sealing insert 123 is furthermore provided with two external O-rings 109, 110 that seal against a telltale groove 123g that runs around the basic body 123b, in its middle section. Two telltale openings 123f that are opposed to each other connect the telltale groove 123g with the room between the radial lip seals 90, 91 in the cylindrical internal 123c and the telltale channel 92 that runs in the gear housing end cover 21 meets the telltale groove 123g in connection with one of the telltale openings 123f. This means that leakage in the radial lip seals 90, 91 can be detected.

Although it has been described above that the object is to supply water to the channel in the drilling shaft 78, via the water hose 7, the water conduit 86, 85, 84, 83 and the water chamber 82, the person skilled in the art will realise that other liquid substances and mixtures thereof also may replace the water. It is also conceivable that gases can be mixed into the liquids (such as a mixture of air and water), but also that gas without any admixed liquid can be supplied to the drilling machine. In addition, it is conceivable to turn the direction of flow by e.g. applying vacuum suction to the water hose 7. For this reason the term drill flow medium is used in the claims in connection with these parts.

The invention claimed is:

1. A drilling machine comprising:
   a motor housing;
   a motor at least partially located within said motor housing;
   a gear box housing;
   a shaft driven by the motor and extending into the gear box housing;
   a drilling shaft extending through said gear box housing and having a longitudinal outgoing channel arranged in the drilling shaft for supply or removal of a drill flow medium to and from a tool part that is connected or connectable to the drilling shaft;
   a transmission, in the gear box housing, located between said shaft driven by the motor and the drilling shaft, said transmission configured to rotate the drilling shaft at a desired rotation speed;
   a drill flow medium room, between the motor housing and the gear box housing, configured such that the entire drill flow medium room can be supplied with the drill flow medium when the drilling machine is in operation;
   an incoming drill flow medium conduit for the supply or removal of the drill flow medium to and from said room, wherein said incoming drill flow medium conduit extends from outside of said room and into said room;
   wherein a rear section of the drilling shaft extends into said drill flow medium room;
   wherein the outgoing channel in the drilling shaft is in communication with said room via the rear section of the drilling shaft;
   wherein said motor housing has a motor housing end cover detachably mounted to the motor housing and wherein said gear box housing has a gear housing end cover detachably mounted to the gear box housing; and
   wherein said motor housing and said motor housing end cover form a rear unit of the drilling machine, and wherein said gear box housing and said gear housing end cover form a front unit of the drilling machine.

2. A drilling machine according to claim 1, wherein the drilling shaft extends through the entire gear box housing, said drilling shaft having a front section diameter that decreases in steps from a portion in a front part of the gear box housing to a rear section diameter of the rear section of the drilling shaft, said rear section diameter is smaller than the diameter of the drilling shaft extending through the front part of the gear box housing.

3. A drilling machine according to claim 1, further comprising at least one radial lip seal arranged on said rear section of the drilling shaft.

4. A drilling machine according claim 3, wherein said at least one radial lip seal is the only radial lip seal mounted on the drilling.

5. A drilling machine according to claim 1, wherein the incoming drill flow medium conduit is at least partly arranged through a channel provided inside the shaft driven by the motor.

6. A drilling machine according to claim 1, wherein said rear unit and said front unit are detachably attached to each other.

7. A drilling machine according to claim 1, wherein the drill flow room is formed between the motor housing end cover and the gear housing end cover.

8. A drilling machine according to claim 1, wherein said drill flow medium room has a vertical extension extending across the longitudinal axis of the drilling shaft when the drilling shaft is in a horizontal orientation, and said vertical extension is larger than a horizontal extension of the room in a transversal direction.

9. A drilling machine according to claim 8, wherein said room has an inlet located at a level below the shaft driven by the motor and said room also has an outlet via the drilling shaft located at a level above said shaft driven by the motor.

10. A drilling machine according to claim 9, wherein said room extends around a sealed off lead-through for said shaft driven by the motor.

11. A drilling machine according to claim 10, wherein:
said shaft driven by the motor is journalled in a bearing located on the side of the motor housing end cover that faces away from the gear housing end cover,
said motor housing end cover includes a projecting portion that extends into an opening in the gear housing end cover, and
a seal is provided on the shaft driven by the motor between said bearing and said projecting portion.

12. A drilling machine according to claim 1, wherein the gear housing end cover is concavely dish-shaped on the side of the gear housing end cover that faces the motor housing end cover, said dish is formed in the gear housing end cover, and wherein said dish and an opposed wall and a projecting center portion of the motor housing end cover define annular walls for the room.

13. A drilling machine according to claim 1, wherein the motor housing end cover is dish-shaped on the side of the gear housing end cover that faces away from the gear housing end cover, thereby defining a fan chamber.

14. A drilling machine according to claim 1, further comprising a sealing insert inserted in the gear housing end cover such that the insert delimits at least a partial room that is supplied with drill flow medium when the drilling machine is in operation.

15. A drilling machine according to claim 14, wherein the sealing insert is provided with at least one seal.

16. A drilling machine according to claim 14, further comprising an external connection connected to the sealing insert, said external connection has a swivelling part such that a hose connected to the swivelling part can point in different directions in relation to the drilling machine.

17. A drilling machine according to claim 14, wherein the sealing insert is positioned in a front part of a handle recess of a handle.

18. A drilling machine according to 17, further comprising a swivelling part connected to the sealing insert such that a connected hose can be swivelled via a handle opening in order to point out laterally on either side of the handle.

19. A drilling machine comprising:
a motor housing having a driving motor a motor housing end cover detachably mounted with screws to the front of the motor housing, said motor housing end cover forms a rear machine unit;
a gear box housing having a gear housing end cover detachably mounted with screws to the rear of the gear box housing, said gear housing end cover forms a front machine unit;
a shaft driven by the motor and extending into the gear box housing;
a drilling shaft extending through said gear box housing;
a transmission in the gear box housing between said shaft driven by the motor and the drilling shaft, said transmission configured to rotate the drilling shaft at a desired rotation speed;
wherein the rear machine unit and the front machine unit can be interconnected with said motor housing end cover and said gear housing end cover bear against each other;
wherein the drilling machine can be split by separating the rear machine unit and the front machine unit from each other without disconnecting any of the motor housing end cover and the gear housing end cover from its respective housing; and
wherein the drilling shaft extends through the entire gear box housing and forms part of the transmission, said drilling shaft having a diameter that decreases in steps from a front part in the gear box housing and wherein a rear section diameter of the rear section of the drilling shaft is smaller than the diameter of the drilling shaft extending through the transmission.

20. A drilling machine comprising:
a motor housing having a driving motor a motor housing end cover detachably mounted with screws to the front of the motor housing, said motor housing end cover forms a rear machine unit;
a gear box housing having a gear housing end cover detachably mounted with screws to the rear of the gear box housing, said gear housing end cover forms a front machine unit;
a shaft driven by the motor and extending into the gear box housing;
a drilling shaft extending through said gear box housing;
a transmission in the gear box housing between said shaft driven by the motor and the drilling shaft, said transmission configured to rotate the drilling shaft at a desired rotation speed;
wherein the rear machine unit and the front machine unit can be interconnected with said motor housing end cover and said gear housing end cover bear against each other;
wherein the drilling machine can be split by separating the rear machine unit and the front machine unit from each other without disconnecting any of the motor housing end cover and the gear housing end cover from its respective housing; and
wherein the motor housing end cover is dish-shaped on a side that faces away from the gear housing end cover, thereby defining a fan chamber.

\* \* \* \* \*